United States Patent [19]

Gorsich

[11] Patent Number: 4,733,958
[45] Date of Patent: Mar. 29, 1988

[54] FORWARD-LENS, LATERAL FIELD REFLECTOR

[76] Inventor: Robert E. Gorsich, 6409 Ashford Ct., Lisle, Ill. 60532

[21] Appl. No.: 723,504

[22] Filed: Apr. 15, 1985

[51] Int. Cl.[4] .............................................. G02C 7/14
[52] U.S. Cl. ...................................... 351/158; 351/50
[58] Field of Search ...................... 350/601, 638, 174; 351/50, 158

[56] References Cited

U.S. PATENT DOCUMENTS

| | | | |
|---|---|---|---|
| 1,871,877 | 8/1932 | Buckman | 350/174 |
| 2,352,644 | 7/1944 | Linderman et al. | 351/158 |
| 3,936,605 | 2/1976 | Upton | 350/174 |
| 3,988,058 | 10/1976 | Chaney | 351/50 |
| 4,349,246 | 9/1982 | Binner | 351/50 |

OTHER PUBLICATIONS

The Optical Journal & Review of Optometry, LXXXVIII, p. 59, 2/1/51.

Primary Examiner—Rodney B. Bovernick
Attorney, Agent, or Firm—A. G. Douvas

[57] ABSTRACT

A visual field image reflector attached to standard eyeglasses to extend vision into an impaired lateral visual field characteristic of a patient suffering from homonymous hemianopsia. The reflector is attached to the eyeglass frame adjacent the patient's nose, forward the lens for an eye having an impaired lateral field and displaced from the line of central fixation of gaze. The reflector includes a light-transmitting substrate and two differently tinted coatings. The first coating, near the patient's eye, is a partially-reflective and partially light-transmitting yellow tinted layer. The second coating, away from the patient's eye, is a light-transmitting, blue-violet layer. The reflected image of the lateral field is thus observed in yellow by the patient, and the portion of the central field image transmitted through the reflector is seen in blue-green.

4 Claims, 8 Drawing Figures

FORWARD-LENS, LATERAL FIELD REFLECTOR

BACKGROUND OF THE INVENTION

This invention relates to a forward-lens, lateral-field reflector to be applied to the eyeglasses of a person having a lateral visual-field defect.

Many stroke victims suffer from lesions that interrupt the visual pathways which interconnect the eyes and the brain. Certain of these lesions produce homonymous hemianopsia, a condition which affects both eyes and causes defects in either the right or left halves of both visual fields without affecting the other half fields. The term "hemianopsia" as used in this specification is not restricted to its literal sense. Rather, it includes a loss in one of the half fields, a loss that is not necessarily complete but that may be partial, relative or even confined to a visual-field quadrant.

In any event, defects in vision however caused which impair the lateral visual field severely restrict a person's awareness of his environment and inhibit physical activity.

The prior art discloses a substantial number of mirror and reflector assemblies which are to be attached to eyeglasses to supplement the field of vision. Such parents include U.S. Pat. Nos. 614,673, 1,074,145, 2,006,645, 2,175,896, 3,988,058 and 4,349,246.

None of these prior art structures is satisfactory in providing an optimum lateral field of vision to a patient having homonymous hemianopsia.

SUMMARY OF THE INVENTION

Accordingly, a principal object of this invention is to increase the effective lateral field of vision of a person afflicted with hemianopsia or homonymous hemianopsia.

Another object is to retain a substantially unobstructed central field of vision for such a person while increasing the effectiveness of the lateral field of vision.

Another object is to enable such person to distinguish between lateral and central field images.

A preferred embodiment of this invention comprises a lateral field reflector which is adjustably attached to standard eyeglasses. The reflector is positioned adjacent the patient's nose and forward of the particular eye having lateral field blindness or impairment. The reflector is preferably generally circular in configuration and is fabricated from a thin substrate of transparent glass or plastic. A tinted coating is applied to each of the opposing faces of the substrate. The coating near the patient's eye is a partially-reflective, light-transmitting yellow layer, and the opposite coating is a light-transmitting, blue-violet layer.

The lateral visual field is reflected from the yellow coating and appears to the patient as a yellow image. The portion of the central visual field viewed through the light-transmitting reflector appears to the patient as a blue-green image. The patient can therefore focus on the lateral image or the central image as desired, and the patient can also easily distinguish between the two images. The reflector directs both colored images to the functioning portions of the retina of an eye afflicted with hemianopsia.

If a patient has homonymous hemianopsia with a blind left hemisphere in both eyes, he is blind to the left-lateral field of vision; however, there is no impairment of the right central field of vision. In this case, the reflector is positioned forward of the eye with lateral field blindness. The reflector increases the effective field of vision of the blind side by reflecting images from that side to remaining functioning retina of the eye having lateral field blindness.

DESCRIPTION OF THE DRAWINGS

In order that all of the structural features for attaining the objects of this invention may be readily understood, reference is made to the following drawings wherein.

DESCRIPTION OF THE PREFERRED EMBODIMENT

Figure 1:
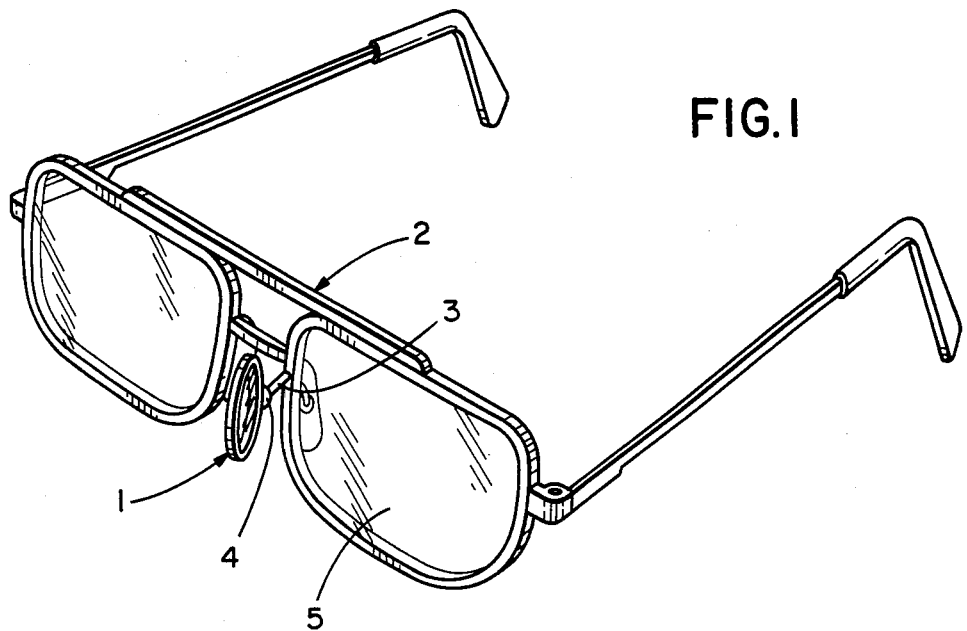
FIG. 1 is a perspective view which shows the lateral field reflector of this invention attached to standard eyeglasses.

Lateral field reflector 1 of this invention (FIGS. 1-3) is preferably attached to standard eyeglasses 2 (FIG. 1) by a bracket 3 (FIGS. 2,3) which includes a ball and socket hinge 4 for adjusting the position of the reflector. The optimum position for reflector 1 is adjacent the patient's nose and forward of the particular eye having lateral field blindness or impairment. For a patient having a blind left hemisphere in both eyes characteristic of homonymous hemianopsia reflector 1 is positioned forward of left eyeglass lens 5 adjacent the patient's nose. Reflector 1 thus increases the effective field of vision of the blind side by reflecting images from that side to the remaining functioning retina. The field of vision for the functioning right hemisphere in the left eye is not significantly obscured by reflector 1, because in a preferred embodiment the reflector is partially transparent.

Reflector 1 is preferably fabricated from a transparent glass or plastic substrate 6 (FIG. 4) with tinted coatings 7 and 8 applied to the parallel, flat opposing faces of the substrate. In a preferred structure for reflector 1, coating 7 (near the patient's eye) is fabricated as a partially-reflective, light-transmitting yellow layer, and coating 8 (removed from the patient's eye) is fabricated as a light-transmitting, blue-violet layer. The two, differently-tinted coatings enable the patient to distinguish the lateral reflected image received by the affected eye from the forward image viewed through reflector 1. Reflector 1 functions much like a light reflecting mirror whose reflected image appears in a color which is different from the transmitted image. The image seen through the reflector and its light filtering coatings 7 and 8 appears in the blue-green portion of the spectrum due to the light subtractive effect of the tinted coatings, while the reflected image appears predominately yellow. The image in the right eye is unchanged because the left hemisphere of the right eye is blind and no light is transmitted through or reflected by reflector 1 to the functioning right hemisphere of that eye.

As a less desirable alternative to reflector 1 and its two tinted coatings 7 and 8, a fully reflecting mirror 9 (FIG. 4) may be substituted for reflector 1. Mirror 9 includes a conventional substrate 10 to which a mirror coating 11, with or without tinting, is applied to one of its faces.

In a preferred embodiment, reflector 1, or alternatively mirror 9, may have a circular or elliptical configuration with a major diameter of approximately 2.5 centimeters. Both substrates 6 and 10 are enveloped by a metallic support ring 12 which is carried on bracket 3.

Figure 6:
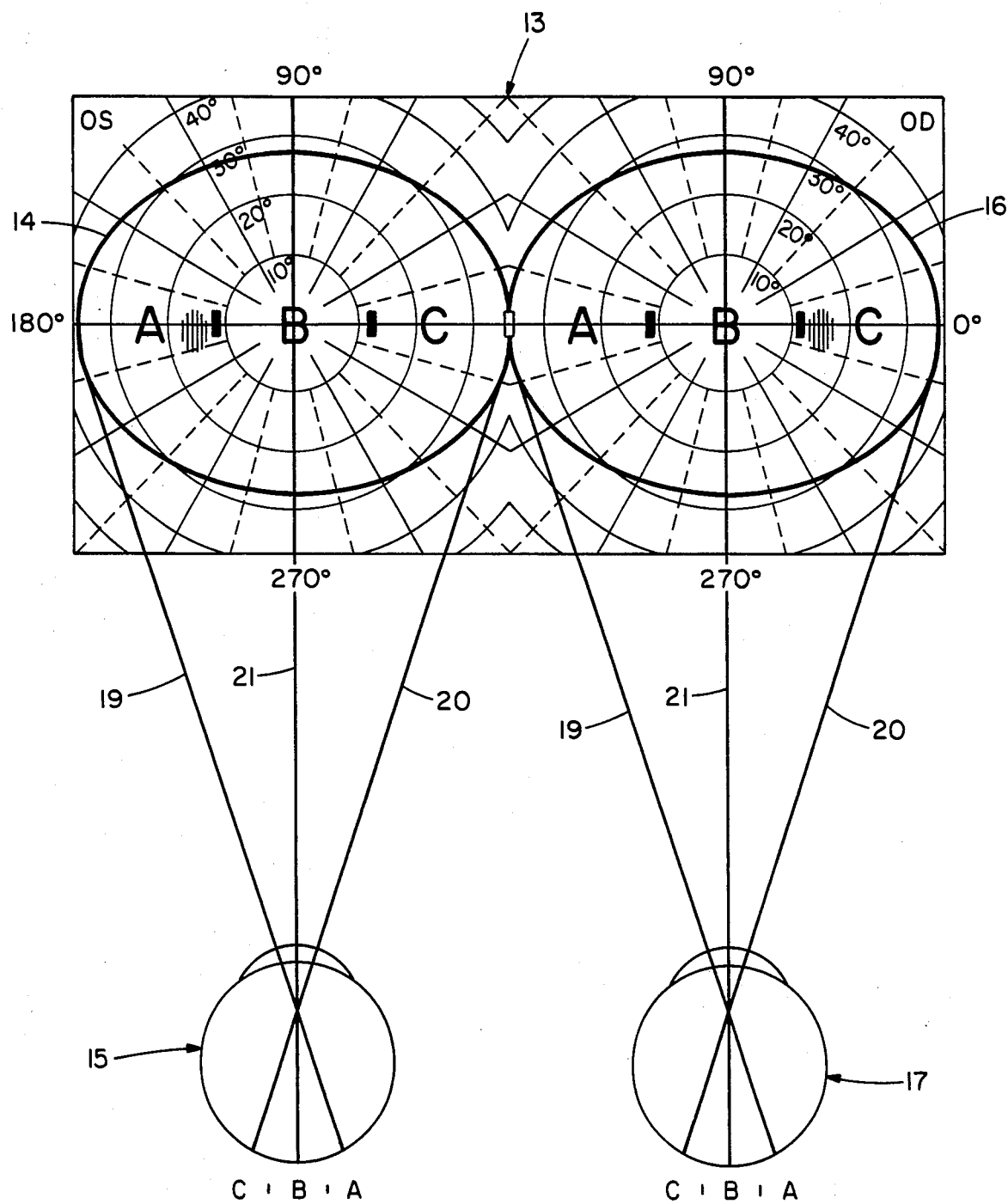
FIG. 6 is a graphic representation of the normal field of vision seen with each eye where the letter B is the point of focus on the retina of each eye.
Figure 7:
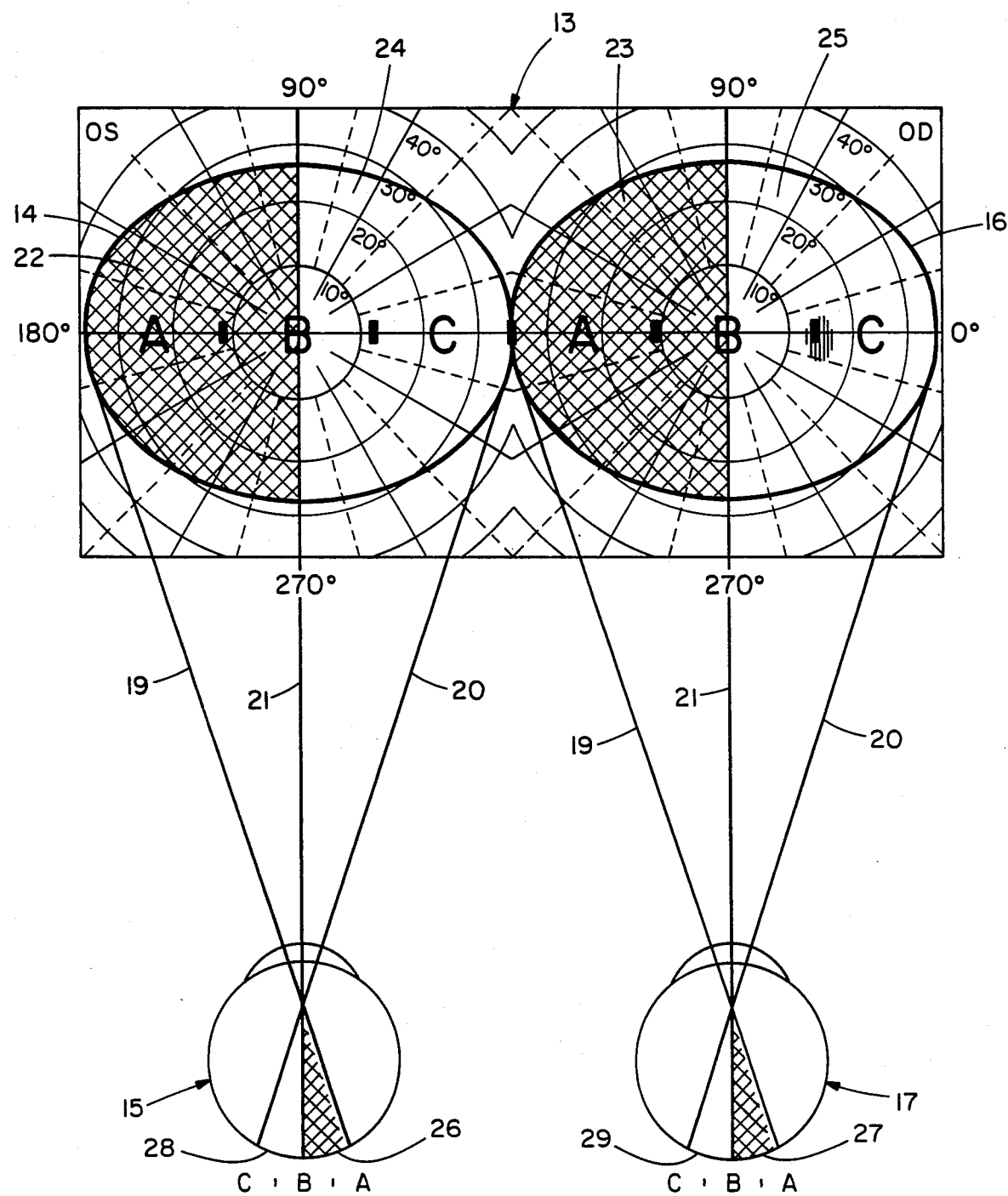
FIG. 7 is a graphic representation of left hemisphere blindness in both eyes characteristic of homonymous hemianopsia.
Figure 8:
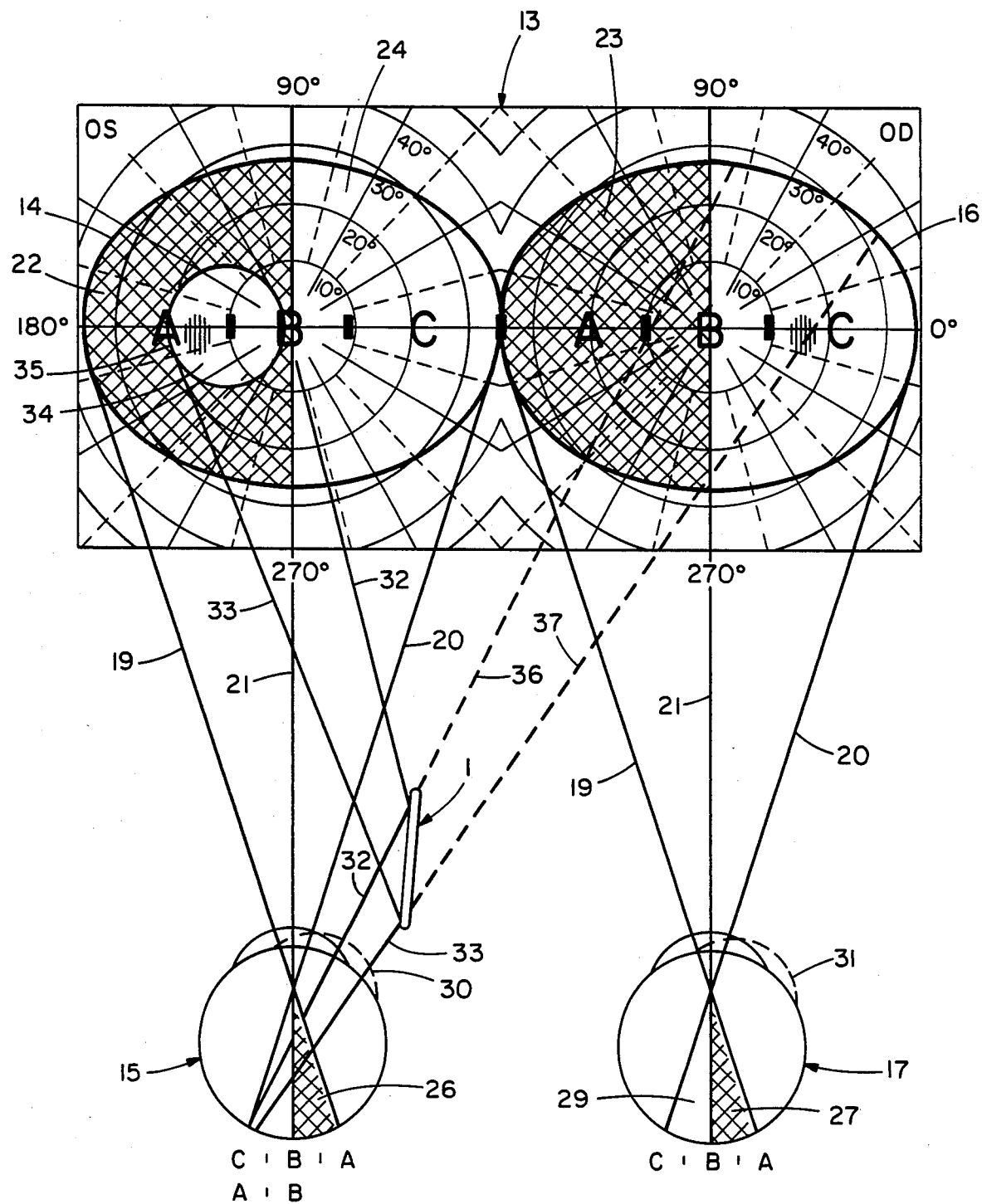
FIG. 8 is a graphic representation of the manner in which a lateral image emanating from the blindside of a patient with a left homonymous hemianopsia is reflected to the functioning retina by the lateral field reflector of this invention.

The visual field diagrams of FIGS. 6 through 8 show the precise manner by which lateral visual field defects resulting in partial blindness are addressed by reflector 1 of this invention. A thorough discussion of visual fields for the medical practitioner appears in "The Interpretation of Visual Fields" authored by Thomas J. Walsh, M.D., et al, and published by the American Academy of Ophthalmology, Rochester, Minn.

The fields of ocular vision are graphically represented in ophthalmic and neurologic examinations on a visual field chart 13 (FIG. 6). For purposes of clinical examination, the field of vision of each eye is usually regarded as the inner surface of part of a hemisphere. This hemisphere is partially depicted on chart 13 by a set of concentric circles (isopters) centered on a point which represents the point of central fixation of gaze. Each successively larger circle represents a correspondingly larger angular deviation measured from the point of central fixation of gaze. In chart 13, the series of numbers associated with each set of concentric isopters represent angular deviations in the field of 10°, 20°, 30°, and 40°, respectively. The perimeter isopter is limited to 40° for simplification. In many charts, the isopter circles extend to 90°. A series of equally spaced radial lines emanating from the point of central fixation of gaze subdivides the field represented by each set of isopters into triangular-shaped 15° sectors varying from 0° to 360°. Elliptical isopter 14 represents the normal visual field of the left eye 15 (OS portion of chart 13), and elliptical isopter 16 represents the normal visual field of the right eye 17 (OD portion of chart 13).

The resulting retinal images generated by letter targets A, B, and C located within the visual fields defined by isopters 14 and 16 appear on the retinas of eyes 15 and 17 between visual field rays 19 and 20. Target letter B located on the point of central fixation of gaze generates an image along central visual field ray 21 which appears on the point of focus on the retina of each eye. Because targets located within the entire area defined by isopters 14 and 16 produce exact retinal images, eyes 15 and 17 are depicted by chart 13 of FIG. 6 as being normal.

Certain lesions that interrupt the visual pathways between the retinas and the brain produce homonymous hemianopsia; that is, they impair the function of both eyes, causing defects in either the right or left halves of both visual fields without affecting the other half fields. The visual fields of a patient who has an identical blind left hemisphere in each eye are illustrated in FIG. 7. Such a patient has a left eye 15 which is blind to the shaded left half 22 of the visual field within isopter 14, and a right eye 17 which is blind to the shaded left half 23 of the visual field within isopter 16. The patient's visual fields are limited to the unshaded right halves 24 and 25 located within isopters 14 and 16, respectively. Accordingly, the patient is without left lateral vision which, for example, renders him blind to target letter A as indicated by shaded retinal areas 26 and 27 (FIG. 7). The normally functioning areas of the retinas of eyes 15 and 17 are represented by the unshaded retinal areas 28 and 29. These areas respond to target letter C.

When lateral field reflector 1 is positioned adjacent the patient's nose in front of the left eye as contemplated by eye glasses 2 (FIGS. 1, 2) and displaced from the line of central focus 21, the left lateral field of vision is altered in the manner graphically illustrated in FIG. 8. If eyes 15 and 17 are rotated to the right, as indicated by broken-line corneas 30 and 31 (FIG. 8), and the patient fixes his focus on partially reflective yellow coating 7 (FIG. 4), visual field rays 32 and 33 reflecting from coating 7, produce a yellow tinted image on the functioning portion of the retina of eye 15. This image is responsive to the left-lateral field of vision 34 located within circular isopter 35. Reflector 1 thus extends the field of vision into the previously shaded left hemisphere 22.

Figure 2:
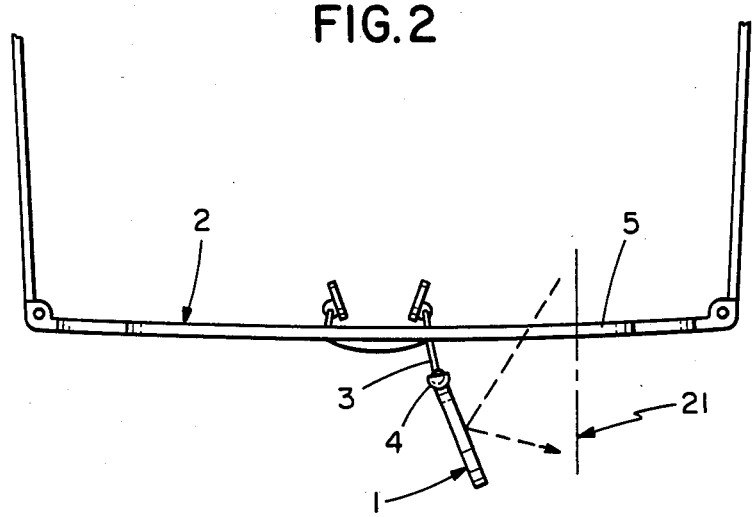
FIG. 2 is a plan view of the eyeglass-reflector structure of FIG. 1.
Figure 3:
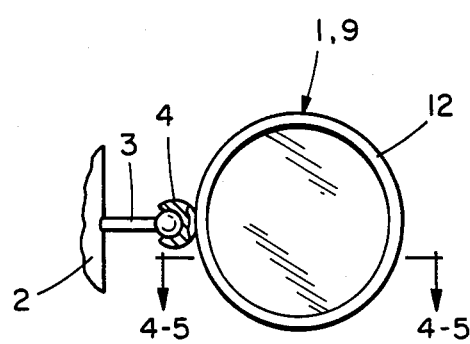
FIG. 3 is an elevation view which shows the lateral field reflector and its eyeglass frame attachment bracket.

It should be noted that in the illustration of FIG. 8, reflector 1 has been rotated clockwise so as to lie in a plane substantially parallel to ray 21, which corresponds to the line of central focus. This distorted position, which deviates from the actual inclined position of reflector 1 relative to eyeglasses 2, as is shown in FIG. 2, is required so that the illustration of FIG. 8 shows graphically the extent to which the field of vision would be extended into otherwise shaded left hemisphere 22.

Figure 4:
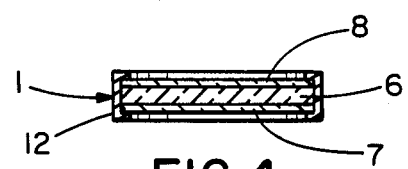
FIG. 4 is a secion view taken along line 4—4 of FIG. 3 which shows the two coatings applied to the substrate of a preferred embodiment of the lateral field reflector.

If eyes 15 and 17 are rotated to the right, as indicated by broken-line corneas 30 and 31 (FIG. 8), and the patient fixes his focus on an image beyond reflector 1 as indicated by broken-line visual field rays 36 and 37, a blue-green image will appear on the functioning portion of the retina of eye 15 due to the subtractive light effect of yellow tinted coating 7 and blue-violet coating 8 (FIG. 4). Accordingly, reflector 1 enables the patient to differentiate selectively between lateral and central images by noting the color of the images, that is yellow or blue-green.

Figure 5:
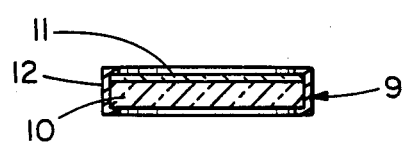
FIG. 5 is a section view taken along line 5—5 of FIG. 3 which shows a single fully reflective coating employed in an alternative embodiment of the lateral field reflector.

In the event fully reflective mirror 9 (FIG. 5) is substituted for reflector 1, the field of central vision represented by broken-line rays 36 and 37 (FIG. 8) will be obstructed by the opaque nature of the mirror. Left lateral vision will be present, however, as represented by visual field rays 32 and 33.

It should be understood that the above described structures are merely illustrative of the principals of this invention. Modifications can be made without departing from the scope of the invention. For example, reflector 1 can be positioned adjacent the patient's nose and in front of the right eyeglass lens to correct for defects in the right hemisphere of the right eye. Additionally, the colors of tinted coatings 7 and 8 may be changed to satisfy a particular patient's color preference.

What is claimed is:

1. In the combination of eyeglasses and a visual-field image reflector attached to the eyeglasses to extend vision, the improvement for extending vision into an impaired lateral visual field comprising eyeglasses with lens, a light-transmitting reflector, means attaching the reflector to the eyeglasses and positioning the reflector adjacent the nasal portion of the eyeglasses and forward of the eyeglass lens for an eye having impaired lateral vision and with the reflector being inclined relative the lens for the impaired eye to reflect lateral field image to a functioning portion of the retina of the eye having the impaired lateral visual field and with central field images being tramsmitted to the impaired eye through the light-transmitting reflector, and in which the reflector includes color tinting means having two different areas of color tint with the lateral field images being reflected from one of the areas in a first color and central field images being transmitted through both of the areas in a second color.

2. In a visual-field image reflector adapted for attachment to eyeglasses to extend vision into an imparted lateral visual field, the improvement comprising a light-transmitting reflector, means positioning the reflector adjacent the nasal portion of the eyeglasses and forward of the eyeglass lens for an eye having impaired lateral vision and with the reflector being inclined relative the lens to reflect lateral field images to a functioning portion of the retina of the eye having the impaired lateral visual field, the reflector having a light-transmitting substrate and a partially-reflective light-transmitting tinted layer contained on a portion of the substrate near the eyeglasses, and a second light-transmitting layer tinted in a different color from that of the first layer contained on a portion of the substrate away from the eyeglasses so that the reflector reflects lateral images from the first layer and transmits central field images through both layers.

3. The combination of claim 2 in which the tint of the second layer is predominately blue-violet.

4. The combination of claim 3 in which the tint of the first layer is predominately yellow so that the reflected lateral images are predominately yellow and transmitted central images are predominately blue-green.

* * * * *